Aug. 24, 1937.       A. J. SCHOLTES       2,091,085
HIGH PRESSURE HOSE COUPLING
Filed May 6, 1936
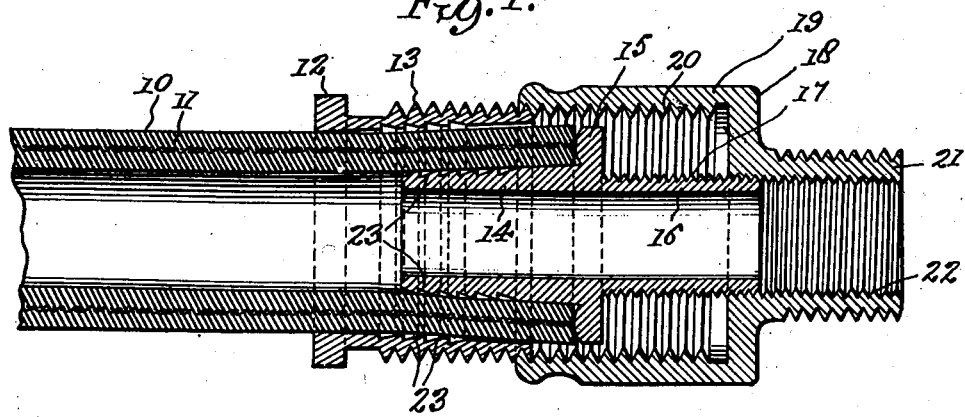
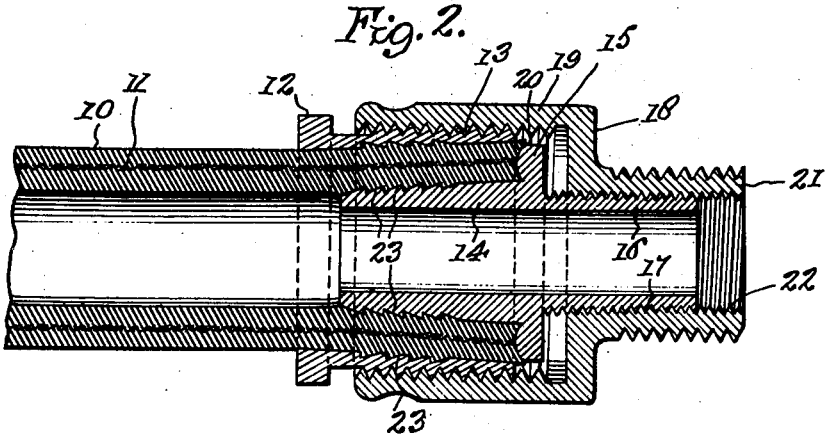
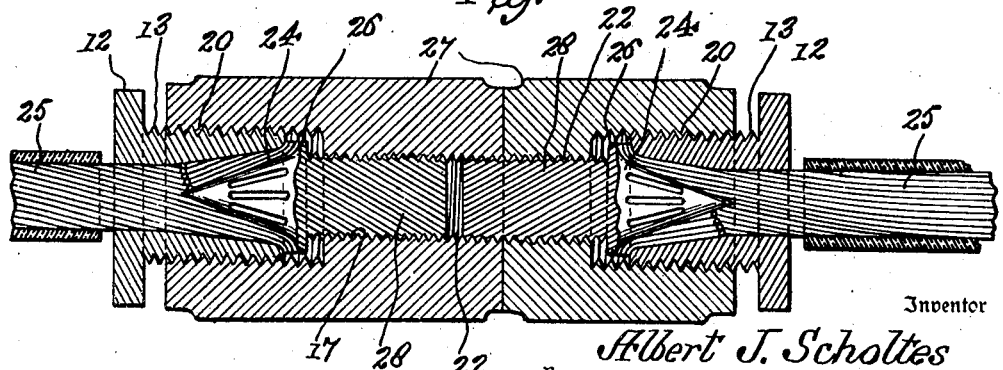
Inventor
Albert J. Scholtes
By Mawhinney & Mawhinney
Attorneys Patented Aug. 24, 1937

2,091,085

UNITED STATES PATENT OFFICE 2,091,085

HIGH PRESSURE HOSE COUPLING

Albert J. Scholtes, Baltimore, Md.

Application May 6, 1936, Serial No. 78,264

4 Claims. (Cl. 285—86)

The present invention relates to couplings for hose, cables, tubes and the like, and more especially to a coupling for high pressure hose to effectively seal the coupling.

At present, high pressure hose couplings which are satisfactory in use are applied only at the factory or shop where special machines are provided for rolling, expanding or otherwise working on the parts and permanently securing them to the lengths of hose. Where a high pressure hose becomes damaged, or when a new section is required, it is necessary to send the data of length to the factory and wait until it can be made up and shipped to the point of use. This results in frequent and expensive shut-downs of operations. There are at present no satisfactory hose couplings for high pressure which may be secured to and removed from the high pressure hose at the point of use.

An object of this invention, therefore, is to provide a high pressure hose coupling which may be effectively secured, at the point of use, in place on a hose after the latter is cut to the required length, and which may be quickly removed to substitute a new length of hose when renewal is necessary; the parts of the coupling being such that they may be relatively operated by the usual tools, such as wrenches and the like. Further, the present used couplings are not only permanently coupled to the hose at the factory but they also are capable of use only once. They cannot be separated and reapplied such as is the case with the present invention.

Another object of this invention is to obtain a relatively high pressure clamping and wedging action by a differential movement of lower pressure movements in a coupling of this type to thus utilize in this particular art the well known differential thread movements.

Another feature of this invention is to provide a pair of relatively axially movable elements which are carried by the hose but which are held from turning on the hose to prevent rotary frictional contact with the hose which causes fractures of the hose surfaces, and wherein the elements move relatively only axially to effect the desired clamping or wedging action on the interposed end of the hose. This feature of the coupling is particularly advantageous in cable connections to keep the separate strands thereof from twisting out of their normal positions, and in tubes it prevents the cutting and galling of the ends of the tubes where the clamping action is applied as this would considerably weaken their structures.

More particularly, the invention provides two clamping elements which are independently connected to a third element by separate threads of different pitches, so that when the third element is turned on the other clamping elements as a fixed unit, the clamping elements will be moved relatively axially to clamp or bind the hose, tube or cable end which may be placed between the clamping elements, and so that the pitches of the separate threads may approach each other to effect a differential movement at a relatively high pressure not obtainable with a single fine thread of sufficient size to be strong and practicable, particularly in a coupling of this character.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a longitudinal section of a high pressure hose coupling applied to the end of a hose and showing the parts in position ready to be clamped.

Figure 2 is a like view, showing the parts in clamped position.

Figure 3 is a longitudinal section taken through a slightly modified form of the invention showing the coupling as applied to a cable and in a clamped position.

Referring now to the drawing, and first to the form of the invention shown in Figures 1 and 2, 10 designates a length of hose of one type which may have a wire inlay 11.

The coupling has a collar or outer member 12 which at its inner end may be held in a suitable tool, such as a wrench or the like, and which has exterior threads 13 extending inwardly for a considerable distance from its outer end. The bore or inner wall of the collar 12 tapers and is adapted to receive therethrough the free end portion of a length of hose 10.

The collar 12 is slid backwardly from the extremity of the hose and a tapering nipple or inner member 14 is fitted into the end of the hose and driven thereinto by a fibre or wooden mallet, or in any other suitable manner, to bind the nipple in the hose and hold the nipple from turning therein. The smaller end of the tapering nipple is slightly greater in diameter than the internal diameter of the hose to secure the desired tight non-rotating fit.

The nipple 14 has an annular outstanding thrust shoulder 15 at its outer end adapted to be forced into contact with the extremity of the hose, not only to effect a tight seal and joint between the hose 10 and nipple 14 but also to effect an electrical connection between the wire inlay 11 of the hose and the coupling. The nipple 14 also carries an outwardly extending portion 16 having external threads 17.

The collar 12 and the nipple 14 are so proportioned as to provide a clamp or wedge therebetween to receive and bind and squeeze the portion of the hose 10 which is fitted over the nipple 14, the latter expanding and flaring the hose end as the nipple is driven into it. The clamping action is obtained by a relative longitudinal or axial movement of the outer and inner members 12 and 14, the outer member or collar 12 being forced longitudinally over the flared hose end to effect the increasing binding and wedging action.

A coupling member or nut 18 is used to obtain the clamping action. The nut 18 has a large end or shell 19 adapted to engage over the collar 12 and has internal threads 20 adapted to engage the threads 13 of the collar. The nut 18 also has a smaller end 21 which may be externally threaded for attachment to a mating coupling or the like, and which has internal threads 22 adapted to engage the threads 17 of the nipple projection 16. The projection 16 is of sufficient length to first engage the smaller end 21 of the nut before the collar 12 engages with the large end 19 of the nut.

During the movement of the coupling member 18 on the clamping elements 12 and 14 there is a relative differential high pressure clamping movement between the clamping elements 12 and 14 as the threads 13 and 20 are of a different pitch as compared with the threads 17 and 22. The collar actuating threads 13 and 20 may be relatively coarse, as shown in the present disclosure, and the nipple actuating threads 17 and 22 may be relatively fine; the collar advancing over the hose end at a greater rate of travel than the rate of travel of the nipple in the clamping member. The result is that the differential movement produced on the collar 12 axially moves the same with increased leverage over the flaring end of the hose to bind and squeeze and compress it on the tapering or conical nipple 14.

In assembling and operating the coupling to secure it on the end of the hose or the like, the collar 12 is first slipped over and backwardly from the end of the hose 10. The nipple 14 is now driven into the end of the hose until the thrust shoulder 15 is brought into intimate contact with the extremity of the hose and against the wire inlay 11. The collar 12 is now brought up by hand toward the thrust shoulder 15 of the nipple 14 to take up the surplus axial play between the collar and the flared end of the hose and nipple. The nut 18 is then applied by first screwing it on the nipple projection 16 until the large end 19 of the nut strikes the collar. Further turning of the nut 18 causes the coarse threads 20 of the nut to engage the corresponding threads 13 of the collar and both the collar and the nipple are drawn into the nut.

However, as the collar is connected to the nut 18 by coarse screw threads of relatively large pitch and as the nipple projection 16 is connected to the nut 18 by fine screw threads of relatively small pitch, the collar 12 will advance faster into the nut 18 and will be drawn axially over the nipple 14 and over the interposed hose end. It is apparent that as the pitches of the collar and nipple threads approach each other, the effective differential pitch movement of the collar will decrease and a greater leverage be obtained. The pressure on the collar is proportional to the differential movements of the collar and the nipple.

The hose end is compressed not only between the collar 12 and nipple 14 but is confined under compression by the thrust shoulder 15 to effect not only a greater compression and squeezing of the hose end but also a more intimate and firm electrical contact between the wire inlay 11 and the shoulder 15 of the coupling.

The collar 12 and the nipple 14 may have forwardly facing circumferential teeth 23 adapted to engage in the outer and inner surfaces of the hose to increase the binding action on the hose end. While the present disclosure shows the inner and outer clamping members 14 and 12 with opposed surfaces which taper in one direction, and the threads of the nut 18 operating in relation thereto, it is understood that the tapering may be reversed and the threads of the nut 18 be correspondingly reversed to obtain the same results.

In some types of hose the electrical wiring is different than as herein shown but in such event the wire may be readily interposed between the clamping elements 14 and 12 and thus brought into contact with the coupling. The coupling thus is adapted for various types of hose and various electrical wiring means.

The nipple 14 may be made without the shoulder 15 where other forms of electrical connections are present.

The clamping members 12 and 14 may be of other form than conical as shown provided they have such structural features as will effect the clamping and compressing action on the hose end when moved axially in relatively opposite directions.

In Figure 3 a slight modification is disclosed, the change being only in the structure of the inner clamping member 24. The member 24, instead of being of hollow or nipple form, may be solid and in the form of a conical plug adapted to be engaged in the end of a cable 25. The strands of the cable are flared over the conical surface of the member 24 and are clamped thereon by the outer collar 12 as in the structure shown in Figures 1 and 2. The thrust shoulder 26 of the member 24 may have an outwardly curved face to receive the ends of the cable strands thereagainst and to deflect the strands outwardly to increase the coupling action. The coupling nut 27 may be of like construction at opposite ends, or may be in two parts as shown connected together by a long projection 28 of one of the inner members 24 engaging in the smaller portions of both of the parts of the nut 27. Any other suitable means may be employed for securing the parts of the coupling nut together.

It is obvious that various changes and modifications may be made in the details of construction and design of the above specifically described embodiment of this invention without departing from the spirit thereof, such changes and modifications being restricted only by the scope of the following claims:

What is claimed is:

1. In a hose coupling, a sleeve adapted for engagement about the end of a hose, a nipple adapted for insertion in the end of the hose, the sleeve and nipple having opposed surface portions for clamping the hose therebetween, and a coupling member having independent threaded advancing connections with the sleeve and the nipple for advancing the sleeve and nipple axially in the same direction upon operation of the coupling member, the threads of one of said advancing connections being faster than the other connection whereby the force applied to clamp the hose between the sleeve and the nipple when assembling is inversely proportionate to the difference in the pitches of the threads.

2. In a hose coupling, a sleeve adapted for engagement about the end of a hose, a nipple for insertion in the end of the hose and having a shoulder for receiving the extremity of the hose thereagainst, the sleeve and nipple having opposed surface portions for clamping the hose therebetween, and a coupling member having independent threaded advancing connections with the sleeve and the nipple for advancing the sleeve and nipple axially in the same direction upon operation of the coupling member, the threads of one of said advancing connections being faster than the other connection whereby the force applied to clamp the hose between the sleeve and the nipple and to compress the extremity of the hose against said shoulder of the nipple when assembling is inversely proportional to the difference in the pitches of the threads of said connections.

3. A high pressure hose coupling, comprising a nipple having a conical portion for engagement in the end of a hose and a shoulder to abut the extremity of the hose end and having a fine screw threaded extension outwardly beyond the shoulder, a sleeve for positioning about the flared end of the hose on the nipple and having exterior coarse screw threads, and a nut having a fine screw threaded bore for turning up on the extension of the nipple to advance the nut inwardly over the flared end of the hose and having a coarse screw threaded bore to engage the coarse threads of the sleeve and draw the latter outwardly into the nut to bind the sleeve over the flared end of the hose and seal the latter over the nipple, the coarse threads of the nut and sleeve adapted to move the collar outwardly at a greater rate of movement than the movement of the nut over the fine threaded extension of the nipple whereby the force applied to compress and seal the shoulder against the extremity of the hose and to clamp the hose between the sleeve and nipple is inversely proportional to the difference in the pitches of the threads.

4. A high pressure hose coupling, comprising a sleeve for engagement about the end of a hose and having exterior threads, a nipple adapted for insertion in the end of the hose and having a shoulder for engagement against the extremity of the hose and having external threads on its outer end, said sleeve and nipple having opposed surface portions for clamping the hose therebetween, and a coupling member having a reduced extension at its outer end exteriorly threaded for connection with a second hose coupling and interiorly threaded for connection with the outer end of the nipple, said coupling member having interior threads in its inner end for threaded connection with the sleeve, said threaded connections of the coupling member with the sleeve and the nipple adapted to advance the sleeve and the nipple axially in one direction and with one threaded connection being faster than the other threaded connection, whereby the force applied to clamp the hose between the sleeve and the nipple and to compress the extremity of the hose against said shoulder of the nipple when assembling is inversely proportional to the difference in the pitches of the threads of said connections.

ALBERT J. SCHOLTES.